Figure 1:
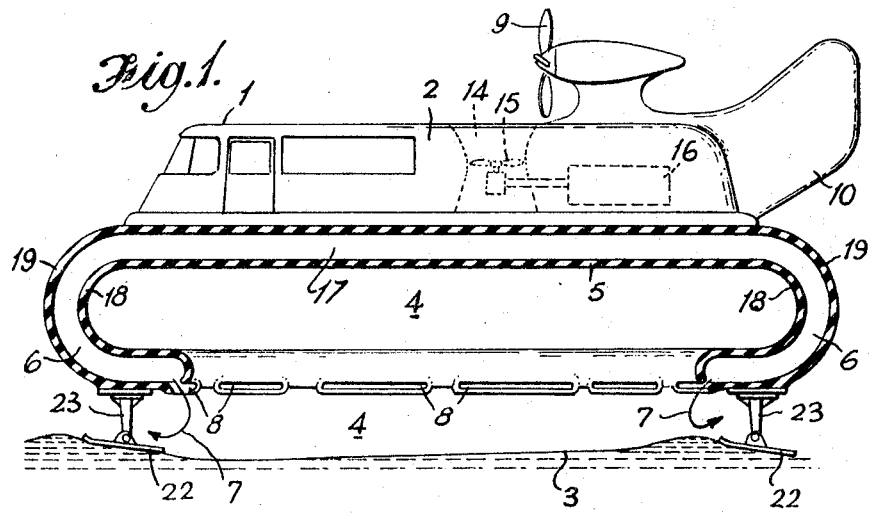

INVENTOR
C. S. COCKERELL
BY
Cameron, Kerkam & Sutton
ATTORNEYS

May 9, 1967  C. S. COCKERELL  3,318,405
FLEXIBLE SKIRT DEFLECTING MEANS FOR GROUND EFFECT VEHICLES
Filed May 6, 1965  2 Sheets-Sheet 2

INVENTOR
C. S. COCKERELL
BY
Cameron, Kerkam & Sutton
ATTORNEYS

United States Patent Office 3,318,405
Patented May 9, 1967

3,318,405
FLEXIBLE SKIRT DEFLECTING MEANS FOR GROUND EFFECT VEHICLES
Christopher Sydney Cockerell, Bassett, Southampton, England, assignor to Hovercraft Development Limited, London, England, a company of Great Britain and Northern Ireland
Filed May 6, 1965, Ser. No. 453,686
Claims priority, application Great Britain, Sept. 1, 1958, 27,978/58
The portion of the term of the patent subsequent to May 11, 1982, has been disclaimed
5 Claims. (Cl. 180—7)

This is a continuation-in-part of applications Ser. Nos. 837,502, filed Sept. 1, 1959, and 329,562, filed Dec. 10, 1963, now Patents Nos. 3,182,739 and 3,182,740, respectively.

This invention relates to vehicles for travelling over a surface and which, in operation, are supported above that surface by one or more cushions of pressurised gas formed and contained beneath the vehicle body.

In particular this invention is concerned with such gas-cushion supported vehicles in which at least part of the peripheral boundary of a gas cushion is formed by flexible means extending below the body of the vehicle as described and claimed in said Patents Nos. 3,182,739 and 3,182,740.

The vertical deflection of the flexible structures forming at least part of the peripheral boundary of a gas cushion can be obtained in many ways. The present invention is concerned with means for deflecting the flexible structures by deflector means which engage the surface over which the vehicle is operating.

It is an object of the present invention to provide a gaseous cushion supported vehicle in which at least part of the periphery of a cushion is formed by a flexible structure extending below the body of the vehicle and provided with downwardly extending surface engaging apparatus which will deflect the flexible structure in a vertical direction on a variation in the clearance between the lower part of the flexible structure and the surface.

It is a further object of the invention to provide a gaseous cushion supported vehicle for operating over land or similar surfaces in which the flexible structure forming at least part of the periphery of a cushion is deflected in a vertical direction by wheels or skids attached to and extending below the flexible structure.

It is a still further object of the invention to provide a flexible connection between the deflector means and the flexible structure.

According to the invention there is provided a vehicle of the type adapted for travelling or hovering over the surface of land or water supported on a cushion of pressurised gas comprising a body having an undersurface capable of sustaining the pressure in said cushion, flexible means extending below said body and forming at least part of the peripheral boundary for said cushion, deflector means attached to and extending below said flexible means adapted to engage the surface over which the vehicle is operating so as to maintain said flexible means out of contact with said surface, and means for introducing gas into the space beneath said body and within said flexible means to form said pressurised gas cushion.

According to a feature of the invention the means for introducing gas into the cushion space includes means for expelling the gas in the form of a curtain issuing below said flexible means to form a part of the peripheral boundary of said cushion space.

Figure 2:
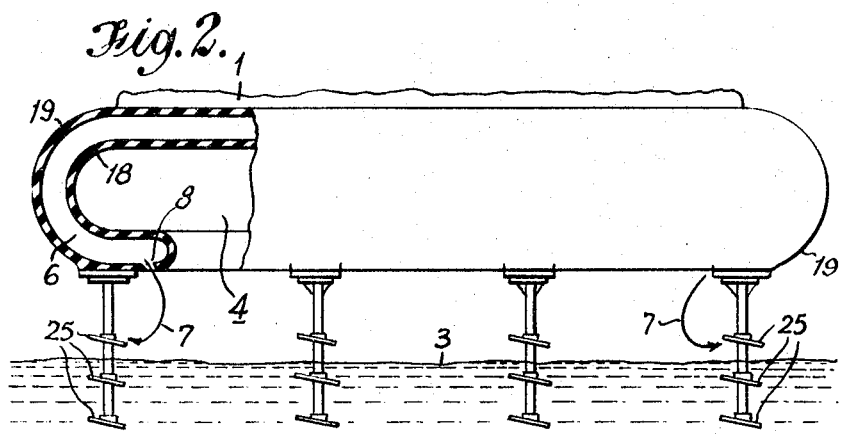
Figure 3:
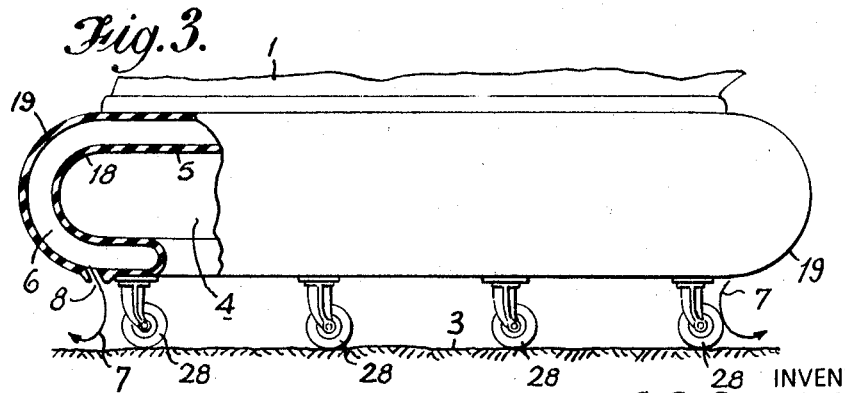
Figure 4:
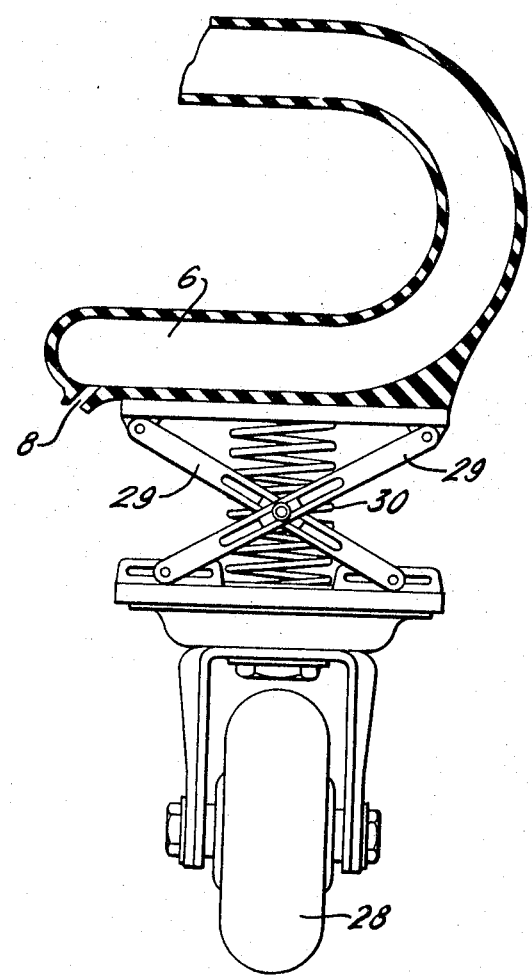

The invention will be readily understood by the following description of certain embodiments, by way of example, in conjunction with the accompanying drawings in which:

FIGURE 1 is a side view of a vehicle operating over a water surface, having planing surfaces attached to the flexible structure, the lower part being shown in section, FIGURE 2 is a side view of the lower part of a vehicle, partly in section, illustrating the provision of hydrofoils, FIGURE 3 is a view similar to that of FIGURE 2, illustrating the provision of wheels, and FIGURE 4 is a side view, to an enlarged scale, illustrating the flexible attachment of a wheel to a flexible structure.

In FIGURE 1 a vehicle 1 has a main body 2 supported above the surface 3 by a cushion of pressurised gas formed in the space 4. The cushion space 4 is bounded on its upper surface by the bottom surface 5 of the vehicle body 2 which is capable of sustaining the pressure in said space. The lateral boundary of the cushion space 4 is formed, for its upper part, by a flexible structure 6 constructed of flexible sheet material such as rubber, which may be re-inforced with fabric and which extends below the vehicle body, and for its lower part by a curtain of moving gas 7 issuing from supply ports 8 formed in the lower part of the flexible structure 6. The vehicle is propelled by a propeller 9, a rudder 10 being provided for steering the vehicle.

Air is drawn in through an intake 14, in the top of the vehicle body, by a propeller 15 driven by an engine 16. The air is fed to a chamber 17 extending over the bottom surface 5 of the vehicle. From the chamber 17 air is fed to the flexible structure 6 which is formed by two spaced apart flexible walls 18 and 19. The air flows down between the walls 18 and 19 and issues from the supply ports 8 to form the air curtain 7. The pressure of the air within the flexible structure 6 tends to maintain the structure in an extended position. The pressure of the air cushion acting on the inner face of the inner flexible wall 18 also tends to maintain the structure 6 in an extended position.

Attached to the lower part of the structure 6 are members 22 which form planing surfaces. The members 22 are pivotally attached to struts 23 which are in turn attached to the flexible structure 6. In operation, when the vehicle is supported by the gas cushion, the members 22 rest on the surface 3. If the clearance between the surface 3 and the lower part of the structure 6 decreases, for example, the planing surfaces react with the surface 3 to lift the flexible structure 6. The deflection may be locally or for the entire periphery. Variation in clearance can arise as a result of a wave, i.e., the surface 3 varying, or by variation in attitude of the vehicle, or by a combination of both.

FIGURE 2 illustrates an alternative arrangement in which a plurality of vertically spaced hydrofoils 25 are provided, instead of the planing surface members 22. As the clearance between the surface 3 and the structure 6 varies, so the immersion of the hydrofoils increases or decreases, creating a lifting or lowering force on the lower part of the flexible structure 6.

For travelling over land wheels or skids can be used. Skids would appear structurally substantially as the planing surface members 22 in FIGURE 1 and their operation would be in a similar manner.

FIGURE 3 illustrates the application of wheels. A number of wheels 28 are attached to the lower part of the flexible structure 6. The operation is similar to that of the planing surface members, and the hydrofoils, described above. Variations in clearance between the surface 3 and the lower part of the flexible structure 6 increases or decreases the load imposed on the structure by the wheels, the flexible structure deflecting up or down. The arrangement produces a very convenient form of vehicle since, although it is desirable to support a large proportion of the total vehicle weight by means of the cushion of fluid beneath the vehicle, it is desirable to have some form of physical contact with the ground to provide resistance to sideways movement of the vehicle due, for example, to a side wind. It is therefore arranged that the cushion supports, say, 90% of the total weight of the vehicle, the wheels or the like supporting the remaining 10%. The wheels are attached to a duct flexibly supported from the body of the vehicle, which makes it unnecessary for the vehicle to operate at a height which avoids obstacles, thus requiring a large supply of power for providing the fluid flow for the formation of the curtains. It will be noted that with wheels attached to the flexible structure, the vehicle is analogous to the conventional forms of land transport in that the mobile or "unsprung" weight is reduced to a minimum.

The wheels may be mounted directly on brackets, as in FIGURE 3, or some form of sprung mounting may be provided as illustrated in FIGURE 4. The wheel 28 in FIGURE 4 is attached to the lower part of the flexible structure 6 by hinged links 29 and a spring 30. The spring 30 will allow vertical displacement of the wheel, when mounting an obstacle, without being restricted by the inertia of the flexible structure.

In normal forms of construction, the wheels and their supporting means would be designed only to carry the aforesaid 10% of the total weight of the vehicle, plus some small additional safety margin. When the curtain system is shut off, such as when the vehicle is not operating, then some means of supporting the remaining 90% of the weight of the vehicle must be provided. This could be means such as extendable jacks brought into operation before shutting off the curtain, or, alternatively, the flexibly supported part could be arranged to deflect upwards under the action of the additional weight until some other supporting means contacted the surface.

I claim:
1. A vehicle of the type adapted for travelling or hovering over the surface of land or water supported on a cushion of pressurised gas comprising a body having an undersurface capable of sustaining the pressure in said cushion, flexible means extending below said body and forming at least part of the peripheral boundary for said cushion, deflector means attached to and extending below said flexible means adapted to engage the surface over which the vehicle is operating so as to maintain said flexible means out of contact with said surface, and means for introducing gas into the space beneath said body and within said flexible means to form said pressurised gas cushion.

2. A vehicle of the type adapted for travelling or hovering over the surface of water supported on a cushion of pressurised gas comprising a body having an undersurface capable of sustaining the pressure in said cushion, flexible means extending below said body and forming at least part of the peripheral boundary for said cushion, at least one planing surface attached to and extending below said flexible means adapted to engage the surface over which the vehicle is operating so as to maintain said flexible means out of contact with said surface, and means for introducing gas into the space beneath said body and within said flexible means to form said pressurised gas cushion.

3. A vehicle of the type adapted for travelling or hovering over the surface of water supported on a cushion of pressurised gas comprising a body having an undersurface capable of sustaining the pressure in said cushion, flexible means extending below said body and forming at least part of the peripheral boundary for said cushion, a plurality of hydrofoils mounted on and at different levels below said flexible means adapted to engage the surface over which the vehicle is operating so as to maintain said flexible means out of contact with said surface, and means for introducing gas into the space beneath said body and within said flexible means to form said pressurised gas cushion.

4. A vehicle of the type adapted for travelling or hovering over the surface of land supported on a cushion of pressurised gas comprising a body having an undersurface capable of sustaining the pressure in said cushion, flexible means extending below said body and forming at least part of the peripheral boundary for said cushion, at least one wheel mounted on and depending below said flexible means adapted to engage the surface over which the vehicle is operating so as to maintain said flexible means out of contact with said surface, and means for introducing gas into the space beneath said body and within said flexible means to form said pressurised gas cushion.

5. A vehicle as claimed in claim 4 in which the wheel is spring mounted on said flexible means.

References Cited by the Examiner
UNITED STATES PATENTS
3,182,739   5/1965   Cockerell _____ 180—7

A. HARRY LEVY, *Primary Examiner.*